US00RE38998E

(19) United States
(12) Reissued Patent
Embree et al.

(10) Patent Number: US RE38,998 E
(45) Date of Reissued Patent: Mar. 7, 2006

(54) BALANCED FLOW VACUUM CLEANER

(75) Inventors: Michael E. Embree, Long Beach, MS (US); Terrance M. Roberts, Diamondhead, MS (US); James F. McCain, Pass Christian, MS (US)

(73) Assignee: Oreck Holdings, LLC, Cheyenne, WY (US)

(21) Appl. No.: 10/764,385

(22) Filed: Jan. 23, 2004

Related U.S. Patent Documents

Reissue of:
(64) Patent No.: 6,148,473
Issued: Nov. 21, 2000
Appl. No.: 09/287,484
Filed: Apr. 6, 1999

(51) Int. Cl.
*A47L 9/24* (2006.01)

(52) U.S. Cl. ..... 15/347; 15/350; 15/351
(58) Field of Classification Search ..... 15/347, 15/350, 351, 422.1
See application file for complete search history.

(56) References Cited

U.S. PATENT DOCUMENTS

| | | | | | |
|---|---|---|---|---|---|
| 869,542 | A | | 10/1907 | Bergens | |
| 1,601,774 | A | | 10/1926 | Scheffer | |
| RE20,489 | E | | 8/1937 | Leathers | |
| 2,187,164 | A | | 1/1940 | Leathers | |
| 2,223,353 | A | | 12/1940 | Demaree | |
| 2,225,621 | A | | 12/1940 | Burkhardt | |
| 2,260,207 | A | | 10/1941 | Berg | |
| 2,300,266 | A | | 10/1942 | Smellie | |
| RE22,370 | E | | 9/1943 | Cummings | |
| 2,618,007 | A | | 11/1952 | Fuller | |
| 2,633,596 | A | | 4/1953 | Turner et al. | |
| 2,672,642 | A | * | 3/1954 | Tamarin et al. | 15/351 |
| 2,702,214 | A | | 2/1955 | Turner | |
| 2,738,538 | A | | 3/1956 | Vance | |
| 2,806,242 | A | * | 9/1957 | Sparklin | 15/351 |
| 2,867,833 | A | * | 1/1959 | Duff | 15/350 |
| 2,898,621 | A | | 8/1959 | Vance | |
| 3,375,540 | A | | 4/1968 | Hyde | |
| 3,704,482 | A | | 12/1972 | Brannon | |
| 3,755,993 | A | * | 9/1973 | Cote | 55/370 |
| 3,797,064 | A | * | 3/1974 | MacFarland | 15/351 |
| 4,011,624 | A | * | 3/1977 | Proett | 15/344 |
| 4,116,648 | A | * | 9/1978 | Busch | 96/387 |
| 4,225,999 | A | * | 10/1980 | Martinec et al. | 15/422.2 |
| D258,211 | S | | 2/1981 | St. Martin | |
| 4,262,384 | A | * | 4/1981 | Bowers | 15/351 |
| 4,354,541 | A | * | 10/1982 | Tilman | 383/63 |
| 4,364,146 | A | | 12/1982 | Bowerman | |
| 4,621,390 | A | | 11/1986 | Hampton et al. | |

(Continued)

FOREIGN PATENT DOCUMENTS

| | | |
|---|---|---|
| DE | 3402603 A1 | 1/1985 |
| DE | 4035411 A1 | 5/1992 |
| EP | 0947155 A2 | 6/1999 |
| GB | 276235 | 8/1927 |
| GB | 838375 | 6/1960 |
| GB | 1336104 | 11/1973 |
| JP | 11056720 | 3/1999 |

*Primary Examiner*—Theresa T. Snider
(74) *Attorney, Agent, or Firm*—Setter Ollila LLC

(57) ABSTRACT

An apparatus and method for transporting a flow of air and particulates through a vacuum cleaner. In one embodiment, the apparatus includes an intake body having an intake opening configured to receive the flow of air into particulates. An airflow propulsion device is coupled to the intake opening to draw the flow through the intake opening and through a flow passage having an approximately constant flow area. The flow continues through one or more conduits from the propulsion device to a filter element housed in a filter housing where the particulates are separated from the flow of air.

26 Claims, 7 Drawing Sheets

U.S. PATENT DOCUMENTS 4,724,574 A * 2/1988 Bowerman et al. ..... 15/351
4,811,450 A 3/1989 Steadings
4,884,315 A * 12/1989 Ehnert ..... 15/350
4,948,639 A * 8/1990 Brooker et al. ..... 428/35.2
4,959,885 A * 10/1990 Sovis et al. ..... 15/350
5,016,315 A * 5/1991 Bledsoe et al. ..... 15/410
5,090,975 A * 2/1992 Requejo et al. ..... 55/367
5,123,141 A 6/1992 Erickson et al.
5,181,946 A * 1/1993 Bosses et al. ..... 55/381
5,309,601 A * 5/1994 Hampton et al. ..... 15/350
5,500,979 A * 3/1996 Worwag ..... 15/351
5,867,863 A * 2/1999 McCormick ..... 15/347
6,115,880 A 9/2000 Wulff et al.
6,131,238 A 10/2000 Weber et al.

* cited by examiner

BALANCED FLOW VACUUM CLEANER

Matter enclosed in heavy brackets [ ] appears in the original patent but forms no part of this reissue specification; matter printed in italics indicates the additions made by reissue.

TECHNICAL FIELD

The present invention relates to methods and apparatuses for transporting a flow of air and particulates through a vacuum cleaner.

BACKGROUND OF THE INVENTION

Conventional upright vacuum cleaners are commonly used in both residential and commercial settings to remove dust, debris and other particulates from floor surfaces, such as carpeting, wood flooring, and linoleum. A typical conventional upright vacuum cleaner includes a wheel-mounted head which includes an intake nozzle positioned close to the floor, a handle that extends upwardly from the head so the user can move the vacuum cleaner along the floor while remaining in a standing or walking position, and a blower or fan. The blower takes in a flow of air and debris through the intake nozzle and directs the flow into a filter bag or receptacle which traps the debris while allowing the air to pass out of the vacuum cleaner.

One drawback with some conventional upright vacuum cleaners is that the flow path along which the flow of air and particulates travels may not be uniform and/or may contain flow disruptions or obstructions. Accordingly, the flow may accelerate and decelerate as it moves from the intake nozzle to the filter bag. As the flow decelerates, the particulates may precipitate from the flow and reduce the cleaning effectiveness of the vacuum cleaner and lead to blocking of the flow path. In addition, the flow disruptions and obstructions can reduce the overall energy of the flow and therefore reduce the capacity of a flow to keep the particulates entrained until the flow reaches the filter bag.

Another drawback with some conventional upright vacuum cleaners is that the blowers and flow path can be noisy. For example, one conventional type of blower includes rotating fan blades that take in axial flow arriving from the intake nozzle and direct the flow into a radially extending tube. As each fan blade passes the entrance opening of the tube, it generates noise which can be annoying to the user and to others who may be in the vicinity of the vacuum cleaner while it is in use.

Still another drawback with some conventional upright vacuum cleaners is that the filter bag may be inefficient. For example, some filter bags are constructed by folding over one end of an open tube of porous filter material to close the one end, and leaving an opening in the other end to receive the flow of air and particulates. Folding the end of the bag can pinch the end of the bag and reduce the flow area of the bag, potentially accelerating the flow through the bag. As the flow accelerates through the bag, the particulates entrained in the flow also accelerate and may strike the walls of the bag with increased velocity, potentially weakening or breaking the bag and causing the particulates to leak from the bag.

SUMMARY OF THE INVENTION

The invention relates to methods and apparatuses for transporting a flow of air and particulates through a vacuum cleaner. In one embodiment, the apparatus includes an intake body having an intake opening configured to be positioned proximate to a floor surface for receiving the flow of air and particulates. The vacuum cleaner can further include a filter housing configured to receive a filter for separating the particulates from the flow of air, and at least one conduit coupled between the intake body and the filter housing. An airflow propulsion device is coupled between the intake opening and the conduit to draw the flow of air and particulates through the intake opening and toward the filter housing. The intake opening, the propulsion device, and the conduit define a flow path for the flow of air and particulates and in one embodiment, the flow path has an approximately constant flow area from the intake opening to the propulsion device.

In another embodiment, a radius of curvature of the flow path from the intake opening through the propulsion device has a radius of a curvature not less than approximately 0.29 inches to provide smooth flow along the flow path. In still another embodiment, the flow path is divided between two conduits, each extending from the intake body toward the filter housing. In one aspect of this embodiment, the combined flow area through the two conduits is less than the flow area through the intake opening.

DETAILED DESCRIPTION OF THE INVENTION

The present invention is directed toward methods and apparatuses for moving a flow of air and particulates into a vacuum cleaner and separating the particulates from the air. The apparatus can include an intake passage and an airflow propulsion device having an approximately constant flow area to reduce pressure losses to the flow. Many specific details of certain embodiments of the invention are set forth in the following description and in FIGS. 1–8 to provide a thorough understanding of such embodiments. One skilled in the art, however, will understand that the present invention may have additional embodiments and that they may be practiced without several of the details described in the following description.

Figure 1:
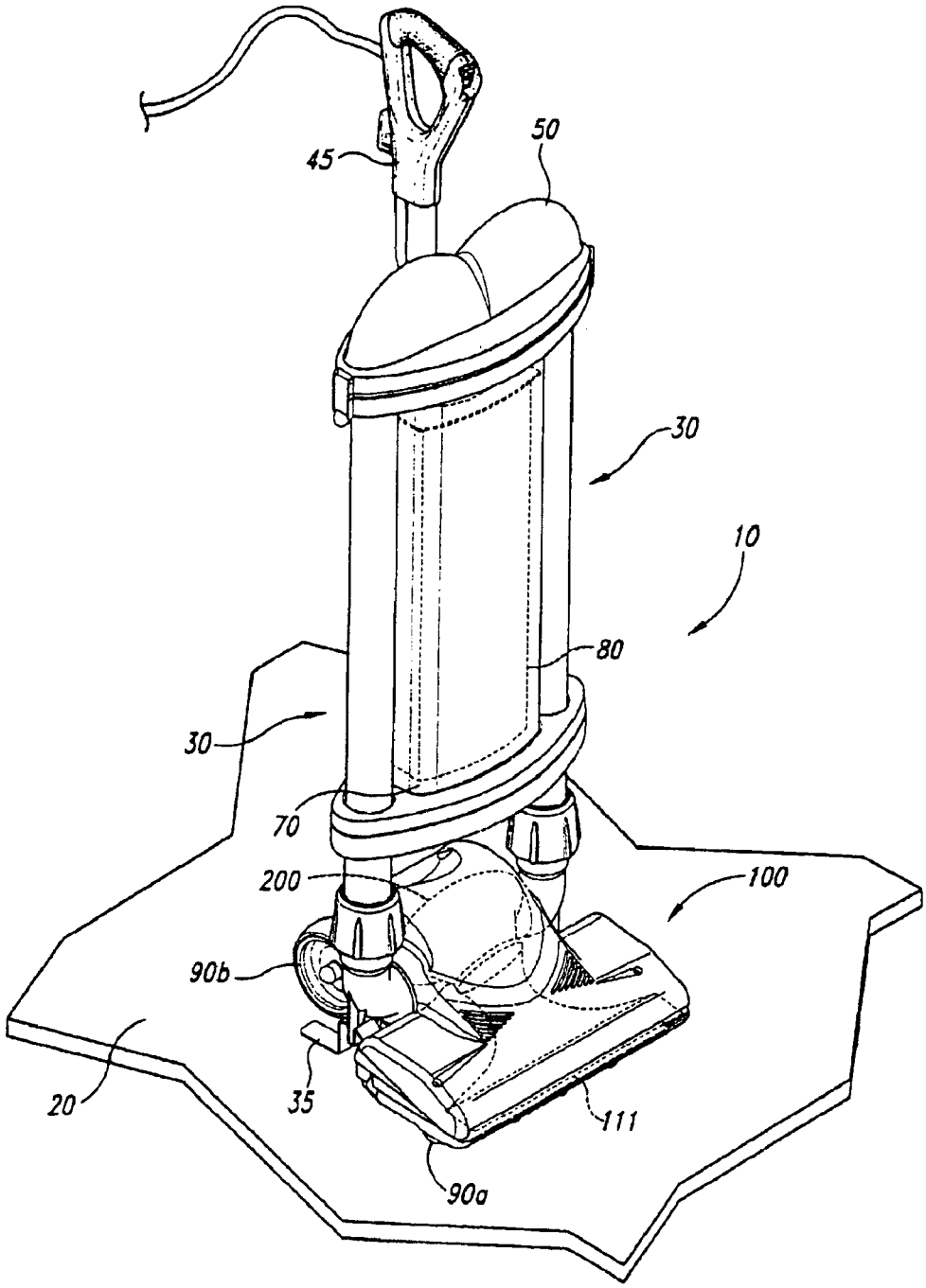
FIG. 1 is a front isomeric view of a vacuum cleaner having an intake body, an airflow propulsion device, a filter and a filter housing in accordance with an embodiment of the invention.

FIG. 1 is an isomeric view of a vacuum cleaner 10 in accordance with an embodiment of the invention positioned to remove the particulates from a floor surface 20. The vacuum cleaner 10 can include a head or intake body 100 having an intake nozzle including an intake aperture 111 for receiving a flow of air and particulates from the floor surface 20. An airflow propulsion device 200 draws the flow of air and particulates through the intake opening 111 and directs the flow through two conduits 30. The conduits 30 conduct the flow to a manifold 50 that directs the flow into a filter element 80. The air passes through porous walls of the filter element 80 and through a porous filter housing 70, leaving the particulates in the filter element 80. The vacuum cleaner 10 further includes an upwardly extending handle 45 and wheels 90 (shown as forward wheels 90a and rear wheels 90b) for controlling and moving the vacuum cleaner over the floor surface 20.

Figure 2:
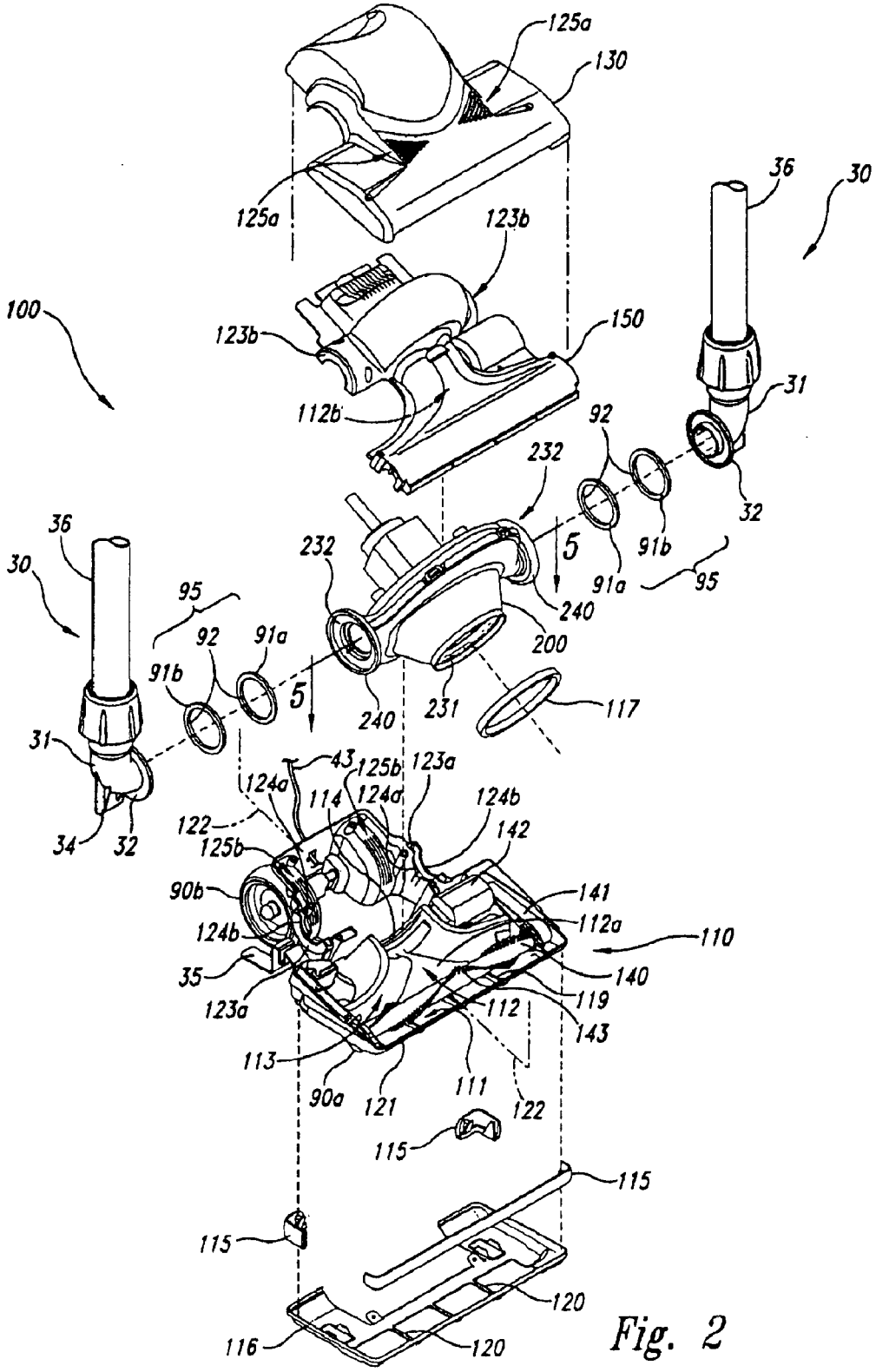
FIG. 2 is an exploded isometric view of an embodiment of the intake body and the airflow propulsion device shown in FIG. 1.

FIG. 2 is an exploded isometric view of an embodiment of the intake body 100 shown in FIG. 1. The intake body 100 includes a baseplate 110 and an inner cover 150 that are joined together around the airflow propulsion device 200. An outer cover 130 attaches to the inner cover 150 from above to shroud and protect the inner cover 150 and the airflow propulsion device 200. A skid plate 116 is attached to the lower surface of the baseplate 110 to protect the baseplate 110 from abrasive contact with the floor surface 20 (FIG. 1). Bumpers 115 are attached to the outer corners of the baseplate 110 to cushion inadvertent collisions between the intake body 100 and the walls around which the vacuum cleaner 10 (FIG. 1) is typically operated.

As shown in FIG. 2, the forward wheels 90a and the rear wheels 90b are positioned to at least partially elevate the baseplate 110 above the floor surface 20 (FIG. 1). In one aspect of this embodiment, the rear wheels 90b can have a larger diameter than the forward wheels 90a. For example, the rear wheels 90b can have a diameter of between four inches and seven inches, and in one embodiment, a diameter of five inches. In a further aspect of this embodiment, the rear wheels 90b can extend rearwardly beyond the rear edge of the intake body 100. An advantage of this arrangement is that it can allow the vacuum cleaner 10 to be more easily moved over stepped surfaces, such as staircases. For example, to move the vacuum cleaner 10 from a lower step to an upper step, a user can roll the vacuum cleaner backwards over the lower step until the rear wheels 90b engage the riser of the step. The user can then pull the vacuum cleaner 10 upwardly along the riser while the rear wheels 90b roll along the riser. Accordingly, the user can move the vacuum cleaner 10 between steps without scraping the intake body 100 against the steps. A further advantage is that the large rear wheels 90b can make it easier to move the vacuum cleaner 10 from one cleaning site to the next when the vacuum cleaner is tipped backward to rest on the rear wheels alone.

In yet a further aspect of this embodiment, the rear wheels 90b extend rearwardly of the intake body 100 by a distance at least as great as the thickness of a power cord 43 that couples the intake body 100 to the handle 45 (FIG. 1). Accordingly, the power cord 43 will not be pinched between the intake body 100 and the riser when the vacuum cleaner 10 is moved between steps. In an alternate embodiment, for example, where users move the vacuum cleaner 10 in a forward direction between steps, the forward wheels 90a can have an increased diameter and can extend beyond the forward edge of the intake body 100.

The outer cover 130 can include intake vents 125a for ingesting cooling air to cool the airflow propulsion device 200. The baseplate 110 can include exhaust vents 125b for exhausting the cooling air. Accordingly, cooling air can be drawn into the intake body 100 through the intake vents 125a (for example, with a cooling fan coupled to the airflow propulsion device 100), past the propulsion device 200 and out through the exhaust vents 125b. In one aspect of this embodiment, the exhaust vents 125b are positioned adjacent the rear wheels 90b. Accordingly, the cooling air can diffuse over the surface of the rear wheels 90b as it leaves the intake body 100, which can reduce the velocity of the cooling air reduce the likelihood that the cooling air will stir up particulates on the floor surface 20.

The intake aperture 111 has an elongated rectangular shape and extends across the forward portion of the baseplate 110. A plurality of ribs 119 extend across the narrow dimension of the intake aperture 111 to structurally reinforce a leading edge 121 of the baseplate 110. The skid plate 116 can also include ribs 120 that are aligned with the ribs 119. Accordingly, the flow of air and particulates can be drawn up through the skid plate 116 and into the intake aperture 111. In one embodiment, the intake aperture 111 can have a width of approximately 16 inches and in other embodiments, the intake aperture can have a width of approximately 20 inches. In still further embodiments, the intake aperture 111 can have other suitable dimensions depending on the particular uses to which the vacuum cleaner 10 is put.

An agitation device, such as a roller brush 140, is positioned just above the intake aperture 111 to aid in moving dust, debris, and other particulates from the floor surface 20 and into the intake aperture 111. Accordingly, the roller brush 140 can include an arrangement of bristles 143 that sweep the particulates into the intake aperture 111. The roller brush 140 can be driven by a brush motor 142 via a flexible belt 141 or other mechanism.

In one embodiment, both the intake aperture 111 and the roller brush 140 are symmetric about a symmetry plane 122 (shown in FIG. 2 in dashed lines) that extends upwardly through the center of the intake body 100 and the vacuum cleaner 10. An advantage of this configuration is that the intake body 100 can be more likely to entrain particulates uniformly across the width of the intake aperture 111 and less likely to leave some of the particulates behind. As will be discussed in greater detail below, other features of the vacuum cleaner 10 are also symmetric about the symmetry plane 122.

The intake body 100 further includes a flow channel 112 positioned downstream of the intake aperture 111 and the roller brush 140. The flow channel 112 includes a lower portion 112a positioned in the baseplate 110 and a corresponding upper portion 112b positioned in the inner cover 150. When the inner cover 150 joins with the baseplate 110, the upper and lower portions 112b and 112a join to form a smooth enclosed channel having a channel entrance 113 proximate to the intake aperture 111 and the roller brush 140, and a channel exit 114 downstream of the channel entrance 113.

In one embodiment, the flow channel 112 has an approximately constant flow area from the channel entrance 113 to the channel exit 114. In one aspect of this embodiment, the flow area at the channel entrance 113 is approximately the same as the flow area of the intake aperture 111 and the walls of the flow channel 112 transition smoothly from the channel entrance 113 to the channel exit 114. Accordingly, the speed of the flow through the intake aperture 111 and the flow channel 112 can remain approximately constant.

As shown in FIG. 2, the channel entrance 113 has a generally rectangular shape with a width of the entrance 113 being substantially greater than a height of the entrance 113. The channel exit 114 has a generally circular shape to mate with an entrance aperture 231 of the airflow propulsion device 200. The channel exit 114 is sealably connected to the airflow propulsion device 200 with a gasket 117 to prevent flow external to flow channel 112 from leaking into the airflow propulsion device and reducing the efficiency of the device.

Figure 3:
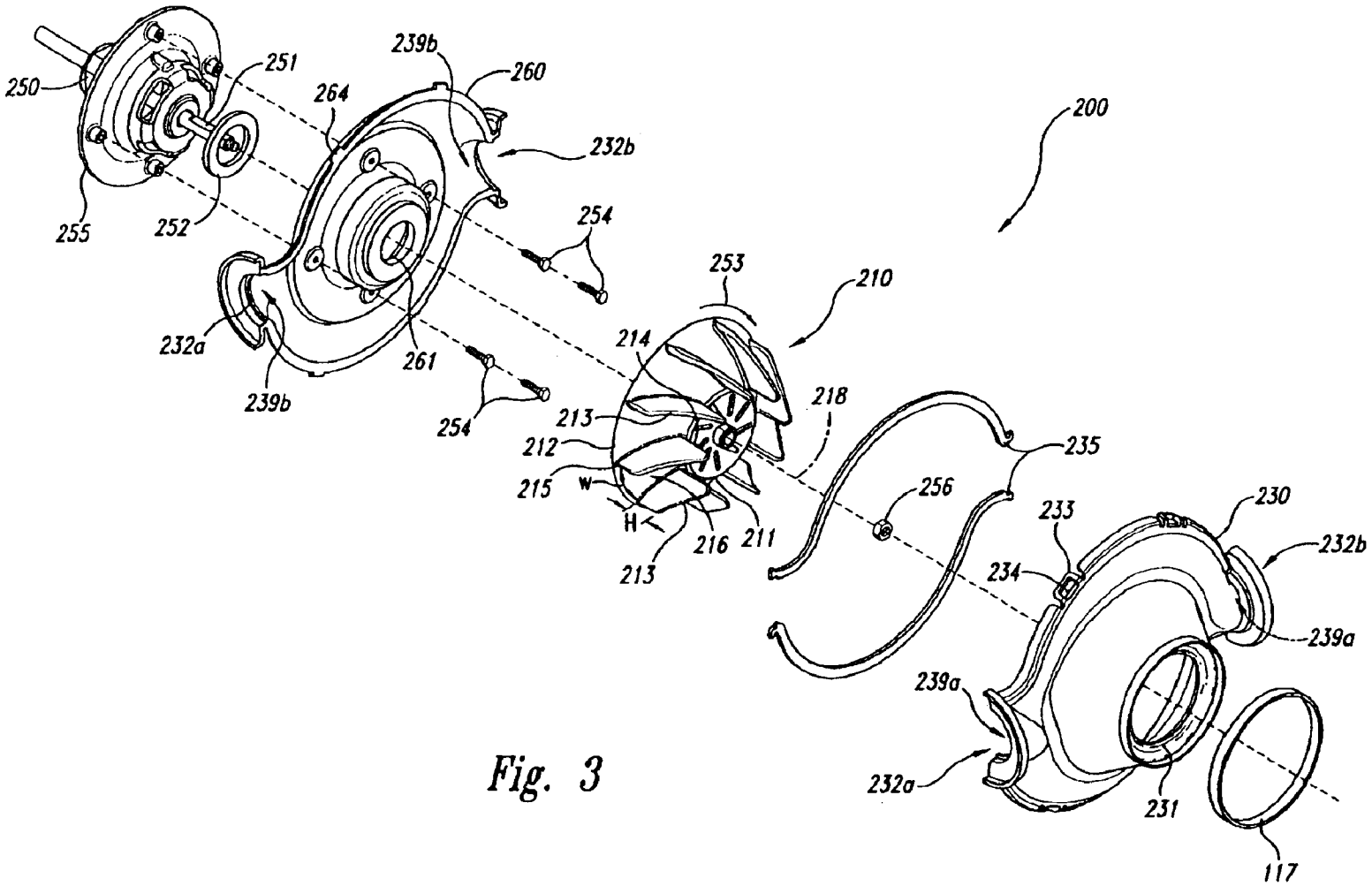
FIG. 3 is an exploded isometric view of the airflow propulsion device shown in FIG. 2.

FIG. 3 is an exploded front isometric view of the airflow propulsion device 200 shown in FIGS. 1 and 2. In the embodiment shown in FIG. 3, the airflow propulsion device 200 includes a fan 210 housed between a forward housing 230 and a rear housing 260. The fan 210 is rotatably driven about a fan axis 218 by a motor 250 attached to the rear housing 260.

The forward housing 230 includes the entrance aperture 231 that receives the flow of air and particulates from the flow channel 112. In one embodiment, the flow area of the entrance aperture 231 is approximately equal to the flow area of the flow channel 112 so that the flow passes unobstructed and at an approximately constant speed into the forward housing 230. The forward housing 230 further includes two exit apertures 232 (shown as a left exit aperture 232a and a right exit aperture 232b) that direct the flow radially outwardly after the flow of air and particulates has passed through the fan 210. The exit apertures 232 are defined by two wall portions 239, shown as a forward wall portion 239a in the forward housing 230 and a rear wall portion 239b in the rear housing 260. The forward and rear wall portions 239a, 239b together define the exit apertures 232 when the forward housing 230 is joined to the rear housing 260.

In one embodiment, the forward housing 230 includes a plurality of flexible resilient clasps 233, each having a clasp opening 234 that receives a corresponding tab 264 projecting outwardly from the rear housing 260. In other embodiments, other devices can be used to secure the two housings 230, 260. Housing gaskets 235 between the forward and rear housings 230, 260 seal the interface therebetween and prevent the flow from leaking from the housings as the flow passes through the fan 210.

The fan 210 includes a central hub 211 and a fan disk 212 extending radially outwardly from the hub 211. A plurality of spaced-apart vanes 213 are attached to the disk 212 and extend radially outwardly from the hub 211. In one embodiment, the vanes 213 are concave and bulge outwardly in a clockwise direction. Accordingly, when the fan 210 is rotated clockwise as indicated by arrow 253, the fan 210 draws the flow of air and particulates through the entrance aperture 231, pressurizes or imparts momentum to the flow, and directs the flow outwardly through the exit apertures 232.

Each vane 213 has an inner edge 214 near the hub 211 and an outer edge 215 spaced radially outwardly from the inner edge. Adjacent vanes 213 are spaced apart from each other to define a channel 216 extending radially therebetween. In one embodiment, the flow area of each channel 216 remains approximately constant throughout the length of the channel. For example, in one embodiment, the width W of each channel 216 increases in the radial direction, while the height H of each channel decreases in the radial direction from an inner height (measured along the inner edge 214 of each vane 213) to a smaller outer height (measured along the outer edge 215 of each vane). In a further aspect of this embodiment, the sun of the flow areas of each channel 216 is approximately equal to the flow area of the entrance aperture 231. Accordingly, the flow area from the entrance aperture 231 through the channel 216 remains approximately constant and is matched to the flow area of the inlet aperture 111, discussed above with reference to FIG. 2.

The fan 210 is powered by the fan motor 250 to rotate in the clockwise direction indicated by arrow 253. The fan motor 250 has a flange 255 attached to the rear housing 260 with bolts 254. The fan motor 250 further includes a shaft 251 that extends through a shaft aperture 216 in the rear housing 260 to engage the fan 210. A motor gasket 252 seals the interface between the rear housing 260 and the fan motor 250 to prevent the flow from escaping through the shaft aperture 261. One end of the shaft 251 is threaded to receive a nut 256 for securing the fan 210 to the shaft. The other end of the shaft 256 extends away from the fan motor, so that it can be gripped while the nut 254 is tightened or loosened.

Figure 4:
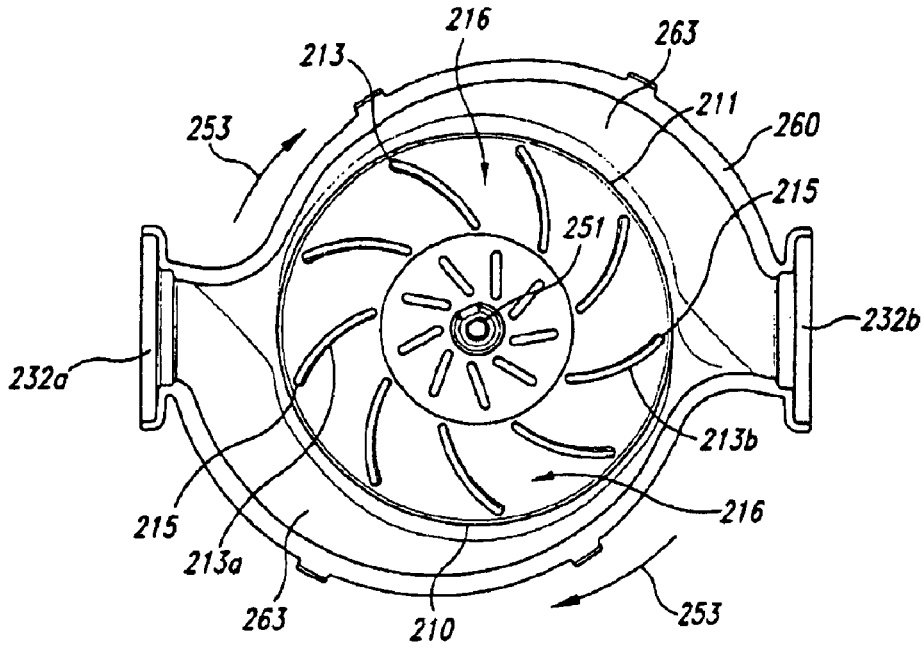
FIG. 4 is a front elevation view of a portion of the airflow propulsion device shown in FIG. 3.

FIG. 4 is a front elevation view of the rear housing 260 and the fan 210 installed on the shaft 251. As shown in FIG. 4, the rear housing 260 includes two circumferential channels 263, each extending around approximately half the circumference of the fan 210. In one embodiment, the flow area of each circumferential channel 263 increases in the rotation direction 253 of the fan 210. Accordingly, as each successive vane 213 propels a portion of the flow into the circumferential channel 263, the flow area of the circumferential channel 263, the flow area of the circumferential channel increases to accommodate the increased flow. In a further aspect of this embodiment, the combined flow area of the two circumferential channels 263 (at the point where the channels empty into the exit apertures 232) is less than the total flow area through the channels 216. Accordingly, the flow will tend to accelerate through the circumferential channels 263. As will be discussed in greater detail below with reference to FIG. 2, accelerating the flow may be advantageous for propelling the flow through the exit apertures 232 and through the conduits 30 (FIG. 2).

In the embodiment shown in FIG. 4, the exit apertures 232 are positioned 180° apart from each other. In one aspect of this embodiment, the number of vanes 213 is selected to be an odd number, for example, nine. Accordingly, when the outer edge 215 of the rightmost vane 213b is approximately aligned with the center of the right exit aperture 232b, the outer edge 215 of the leftmost vane 213a (closest to the left exit aperture 232a) is offset from the center of the left exit aperture). As a result, the peak noise created by the rightmost vane 213b as it passes the right exit aperture 232b does not occur simultaneously with the peak noise created by the leftmost vane 213a as the leftmost vane passes the left exit aperture 232a. Accordingly, the average of the noise generated at both exit apertures 232 can remain approximately constant as the fan 210 rotates, which may be more desirable to those within earshot of the fan.

As discussed above, the number of vanes 213 can be selected to be an odd number when the exit apertures 232 are spaced 180° apart. In another embodiment, the exit apertures 232 can be positioned less than 180° apart and the number of vanes 213 can be selected to be an even number, so long as the vanes are arranged such that when the rightmost vane 213b is aligned with the right exit aperture 232b, the vane closest to the left exit aperture 232a is not aligned with the left exit aperture. The effect of this arrangement can be the same as that discussed above (where the number of vanes 213 is selected to be an odd number), namely, to smooth out the distribution of noise generated at the exit apertures 232.

Figure 5:
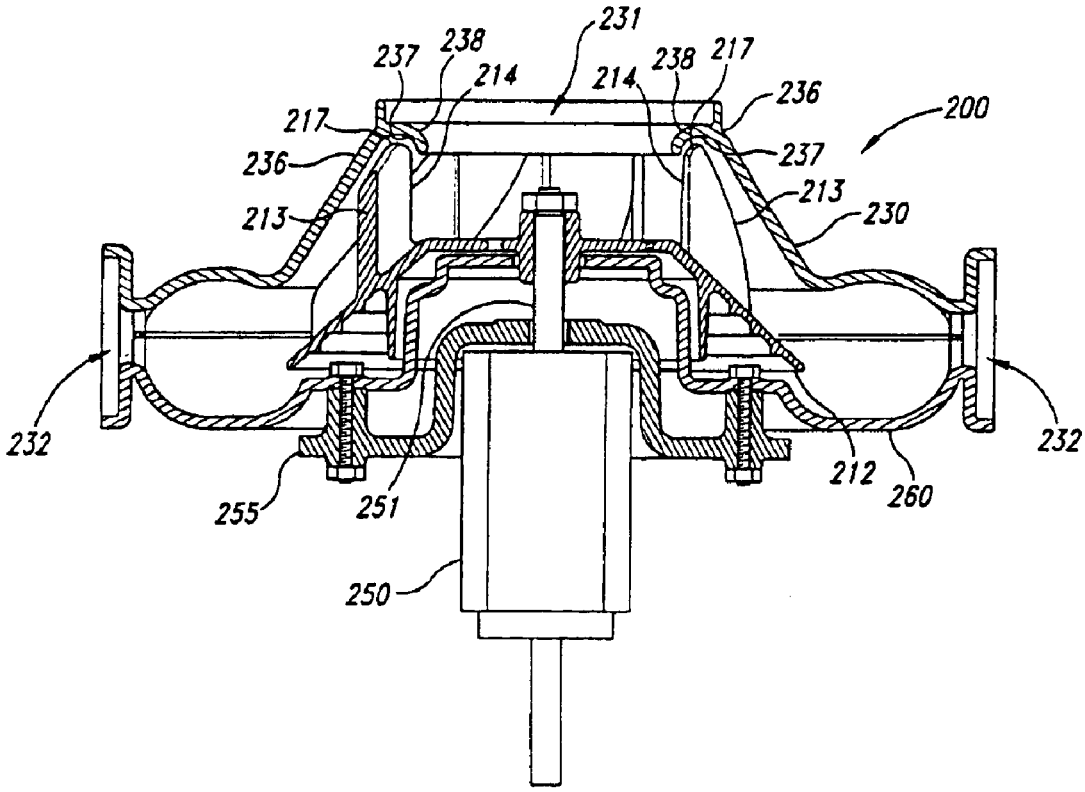
FIG. 5 is a cross-sectional side elevation view of the airflow propulsion device shown in FIG. 3.

FIG. 5 is a cross-sectional side elevation view of the airflow propulsion device 200 shown in FIG. 2 takes substantially along line 5—5 of FIG. 2. As shown in FIG. 5, each vane 213 includes a projection 217 extending axially away from the fan motor 250 adjacent the inner edge 214 of the vane. In the embodiment shown in FIG. 5, the projection 217 can be rounded, and in other embodiments, the projection 217 can have other non-rounded shapes. In any case, the forward housing 230 includes a shroud portion 236 that receives the projections 217 as the fan 210 rotates relative to the forward housing. An inner surface 237 of the shroud portion 236 is positioned close to the projections 217 to reduce the amount of pressurized flow that might leak past the vanes 213 from the exit apertures 232. For example, in one embodiment, the inner surface 237 can be spaced apart from the projection 217 by a distance in the range of approximately 0.1 inches to 0.2 inches, and preferably about 0.1 inches. An outer surface 238 of the shroud portion 236 can be rounded and shaped to guide the flow entering the entrance aperture 231 toward the inner edges 214 of the vanes 213. An advantage of this feature is that it can improve the characteristics of the flow entering the fan 210 and accordingly increase the efficiency of the fan. Another advantage is that the flow may be less turbulent and/or less likely to be turbulent as it enters the fan 210, and can accordingly reduce the noise produced by the fan 210.

In one embodiment, the fan 210 is sized to rotate at a relative slow rate while producing a relatively high flow rate. For example, the fan 210 can rotate at a rate of 7,700 rpm to move the flow at a peak rate of 132 cubic feet per minute (cfm). As the flow rate decreases, the rotation rate increases. For example, if the intake aperture 111 (FIG. 2) is obstructed, the same fan 210 rotates at about 8,000 rpm with a flow rate of about 107 cfm and rotates at about 10,000 rpm with a flow rate of about 26 cfm.

In other embodiments, the fan 210 can be selected to have different flow rates at selected rotation speeds. For example, the fan 210 can be sized and shaped to rotate at rates of between about 6,500 rpm and about 9,000 rpm and can be sized and shaped to move the flow at a peak rate of between about 110 cfm and about 150 cfm. In any case, by rotating the fan 210 at relatively slow rates while maintaining a high flow rate of air through the airflow propulsion device 200, the noise generated by the vacuum cleaner 10 can be reduced while maintaining a relatively high level of performance.

In a further aspect of this embodiment, the performance of the airflow propulsion device 200 (as measured by flow rate at a selected rotation speed) can be at least as high when the airflow propulsion device 200 is uninstalled as when the airflow propulsion device is installed in the vacuum cleaner 10 (FIG. 1). This effect can be obtained by smoothly contouring the walls of the intake aperture 111 (FIG. 2) and the flow channel 112 (FIG. 2). In one embodiment, the intake aperture 111 and the flow channel 112 are so effective at guiding the flow into the airflow propulsion device 200 that the performance of the device is higher when it is installed in the vacuum cleaner 10 than when it is uninstalled.

Returning now to FIG. 2, the flow exists the airflow propulsion device 200 through the exit apertures 232 in the form of two streams, each of which enters one of the conduits 30. In other embodiments, the airflow propulsion device can include more than two apertures 232, coupled to a corresponding number of conduits 30. An advantage of having a plurality of conduits 30 is that if one conduit 30 becomes occluded, for example, with particles or other matter ingested through the intake aperture 111, the remaining conduit(s) 30 can continue to transport the flow from the airflow propulsion device. Furthermore, if one of the two conduits 30 becomes occluded, the tone produced by the vacuum cleaner 10 (FIG. 1) can change more dramatically than would the tone of a single conduit vacuum cleaner having the single conduit partially occluded. Accordingly, the vacuum cleaner 10 can provide a more noticeable signal to the user that the flow path is obstructed or partially obstructed.

Each conduit 30 can include an elbow section 31 coupled at one end to the exit aperture 232 and coupled at the other end to an upwardly extending straight section 36. As was described above with reference to FIG. 4, the combined flow area of the two exit apertures 232 is less than the flow area through the intake opening 111. Accordingly, the flow can accelerate and gain sufficient speed to overcome gravitational forces while the travelling upwardly from the elbow sections 31 through the straight sections 36. In one aspect of this embodiment, the reduced flow area can remain approximately constant from the exit apertures 232 to the manifold 50 (FIG. 1).

In one embodiment, the radius of curvature of the flow path through the elbow section 31 is not less than about 0.29 inches. In a further aspect of this embodiment, the radius of curvature of the flow path is lower in the elbow section than anywhere else between the airflow propulsion device 200 and the filter element 80 (FIG. 1). In still a further aspect of this embodiment, the minimum radius of curvature along the entire flow path, including the portion of the flow path passing through the airflow propulsion device 200, is not less than 0.29 inches. Accordingly, the flow is less likely to become highly turbulent than in vacuum cleaners having more sharply curved flow paths, and may therefore be more likely to keep the particulates entrained in the flow.

Each elbow section 31 is sealed to the corresponding exit aperture 232 with an elbow seal 95. In one embodiment, the elbow sections 31 can rotate relative to the airflow propulsion device 200 while remaining sealed to the corresponding exit aperture 232. Accordingly, users can rotate the conduits 30 and the handle 45 (FIG. 1) to a comfortable operating position. In one aspect of this embodiment, at least one of the elbow sections 31 can include a downwardly extending tab 34. When the elbow section 31 is oriented generally vertically (as shown in FIG. 2), the tab 34 engages a tab stop 35 to lock the elbow section 31 in the vertical orientation. In one embodiment, the tab stop 35 can be formed from sheet metal, bent to form as slot for receiving the tab 34. The tab stop 35 can extend rearwardly from the baseplate 10 so that when the user wishes to pivot the elbow sections 32 relative to the intake body 100, the use can depress the tab stop 35 downwardly (for example, with the user's foot) to release the tab 34 and pivot the elbow sections 31.

In one embodiment, each elbow seal 95 can include two rings 91, shown as an inner ring 91a attached to the airflow propulsion device 200 and an outer ring 91b attached to the elbow section 31. The rings 91 can include a compressible material, such as felt, and each inner ring 91a can have a surface 92 facing a corresponding surface 92 of the adjacent outer ring 92b. The surfaces 92 can be coated with Mylar or another non-stick material that allows relative rotational motion between the elbow sections 31 and the airflow propulsion device 200 while maintaining the seal therebetween. In a further aspect of this embodiment, the non-stick material is seamless to reduce the likelihood for leaks between the rings 91. In another embodiment, the elbow seal 95 can include a single ring 91 attached to at most one of the airflow propulsion device 200 or the elbow section 31. In a further aspect of this embodiment, at least one surface of the ring 91 can be coated with the non-stick material to allow the ring to more easily rotate.

Each elbow section 31 can include a male flange 32 that fits within a corresponding female flange 240 of the airflow propulsion device 200, with the seal 95 positioned between the flanges 32, 240. Retaining cup portions 123, shown as a lower retaining cup portion 123a in the base plate 110 and an upper retaining cup portion 123b in the inner cover 150, receive the flanges 32, 240. The cup portions 123 have spaced apart walls 124, shown as an inner wall 124a that engages the female flange 240 and an outer wall 124b that engages the male flange 32. The walls 124a, 124b are close enough to each other that the flanges 32, 240 are snugly and sealably engaged with other, while still permitting relative rotational motion of the male flanges 32 relative to the female flanges 240.

Figure 6:
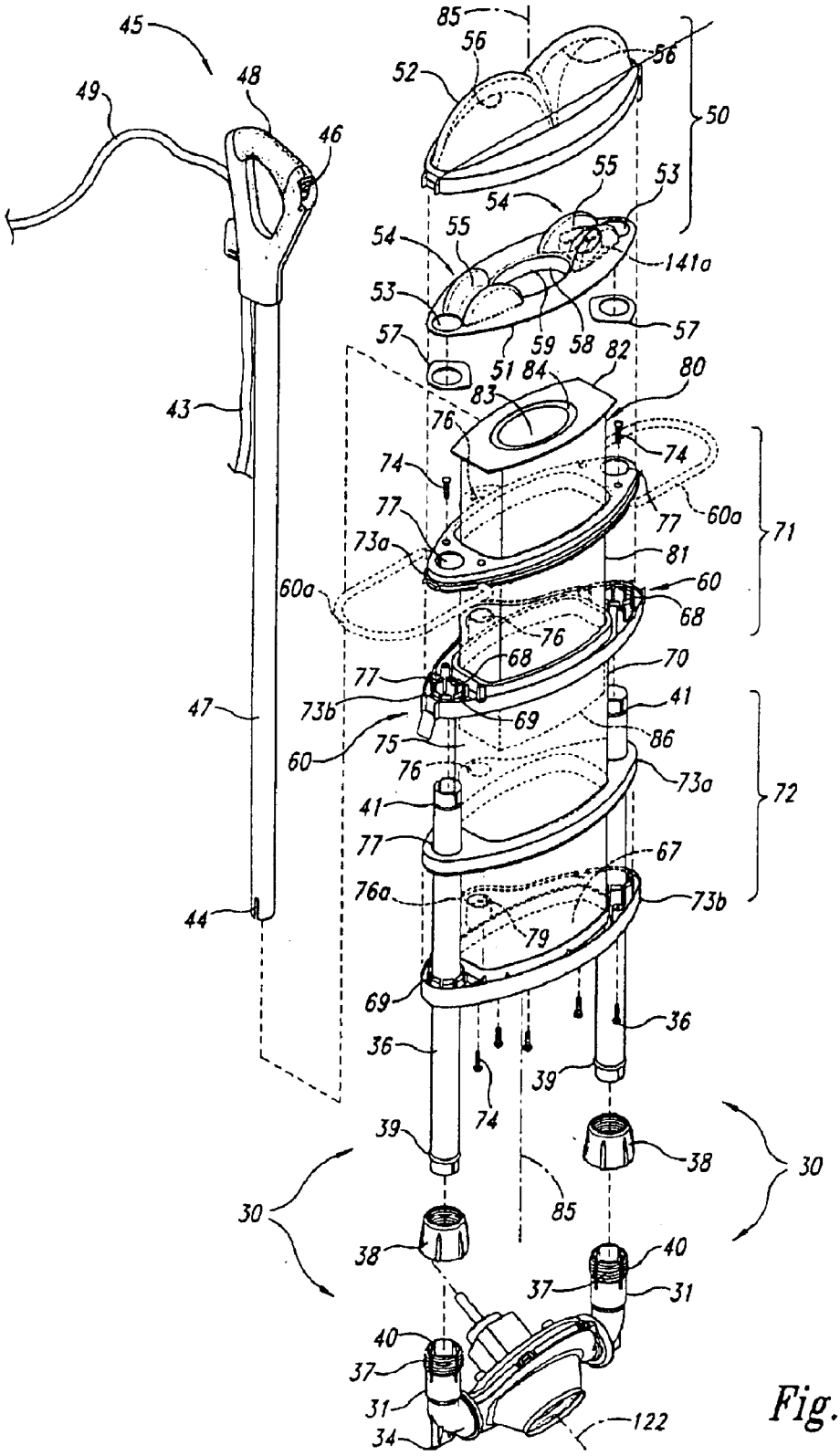
FIG. 6 is an exploded isometric view of an embodiment of the filter housing, filter and manifold shown in FIG. 1.
Figure 7:
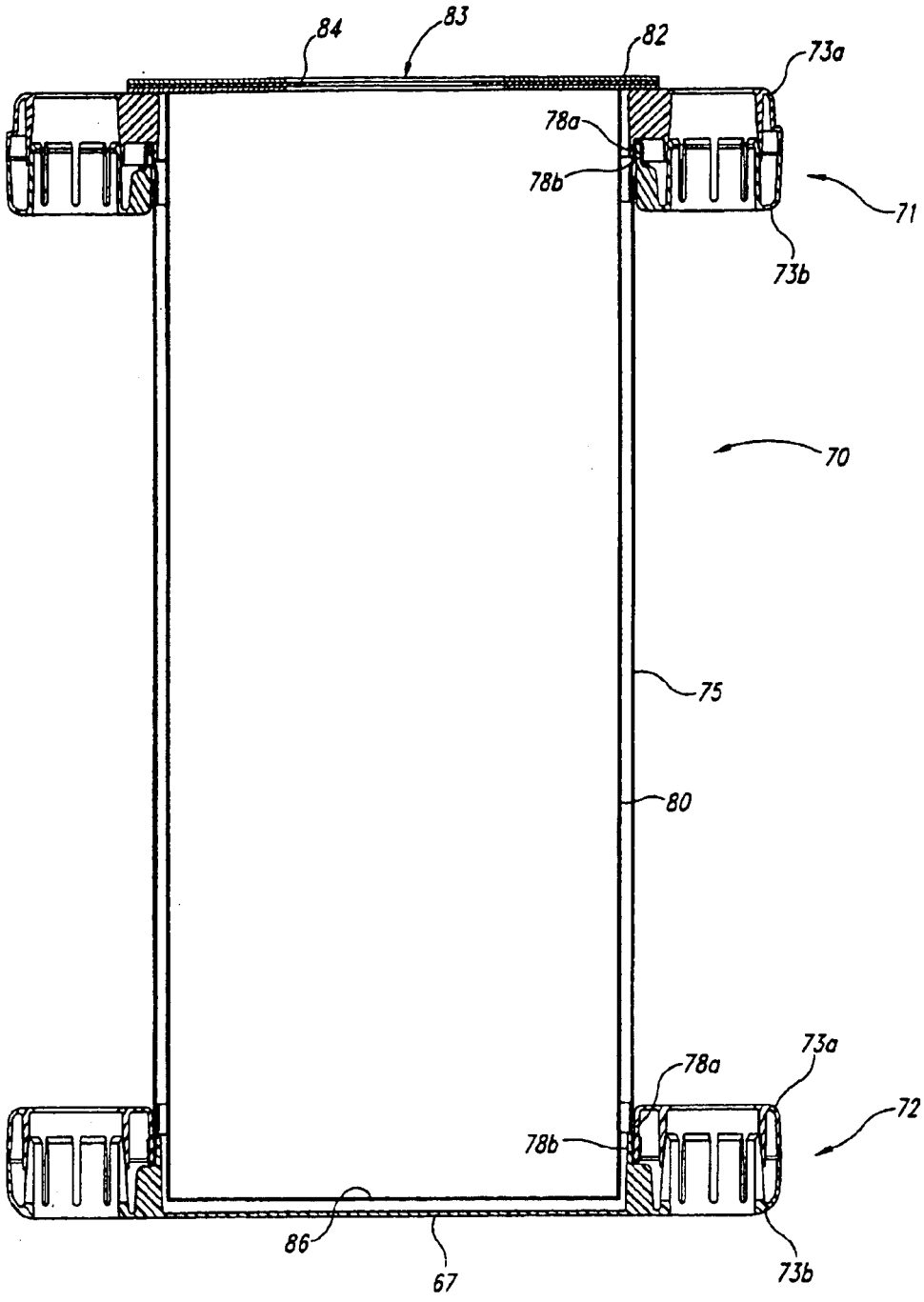
FIG. 7 is a cross-sectional front elevation view of the filter housing and filter shown in FIG. 1.

FIG. 6 is a front exploded isometric view of the conduits 30, the filter housing 70, the manifold 50 and the propulsion device 200 shown in FIG. 1. Each of these components is arranged symmetrically about the symmetry plane 122. Accordingly, in one embodiment, the entire flow path from the intake opening 111 (FIG. 2) through the manifold 50 is symmetric with respect to the symmetry plane 122. Furthermore, each of the components along the flow path can have a smooth surface facing the flow path to reduce the likelihood for decreasing the momentum of the flow.

As shown in FIG. 6, the conduits 30 include the elbow sections 31 discussed above with reference to FIG. 2, coupled to the straight sections 36 which extend upwardly from the elbow sections 31. In one embodiment, each straight section 36 is connected to the corresponding elbow section 31 with a threaded coupling 38. Accordingly, the upper portions of the elbow sections 31 can include tapered external threads 37 and slots 40. Each straight section 36 is inserted into the upper portion of the corresponding elbow section 31 and an O-ring 39 toward the lower end of the straight section is positioned below the slots 40 to seal against an inner wall of the elbow section 31. The coupling 38 is then threaded onto the tapered threads 37 of the elbow section 31 so as to draw the upper portions of the elbow section 31 radially inward and clamp the elbow section around the straight section 36. The couplings 38 can be loosened to separate the straight sections 36 from the elbow sections 31, for example, to remove materials that might become caught one either section.

Each straight section 36 extends upwardly on opposite sides of the filter housing 70 from the corresponding elbow section 31 into the manifold 50. Accordingly, the straight sections 36 can improve the rigidity and stability of the vacuum cleaner 10 (FIG. 1) and can protect the housing 70 from incidental contact with furniture or other structures during use. In the manifold 50, the flows from each straight section 36 are combined and directed into the filter element 80, and then through the filter housing 70, as will be discussed in greater detail below.

The manifold 50 includes a lower portion 51 attached to an upper portion 52. The lower portion 51 includes two inlet ports 53, each sized to receive flow from a corresponding one of the straight sections 36. A flow passage 54 extends from each inlet port 53 to a common outlet port 59. As shown in FIG. 6, each flow passage 54 is bounded by an upward facing surface 55 of the lower portion 51, and by a downward facing surface 56 of the upper portion 52. The lower portion 51 can include a spare belt 141a stored beneath the upward facing surface 55. The spare belt 141a can be used to replace the belt 141 (FIG. 2) that drives the roller brush 140 (FIG. 2).

In the embodiment shown in FIG. 6, the outlet port 59 has an elliptical shape elongated along a major axis, and the flow passages 54 couple to the outlet port 59 at opposite ends of the major axis. In other embodiments, the flow passages can couple to different portions of the outlet port 59, as will be discussed in greater detail below with reference to FIG. 8. In still further embodiments, the outlet port 59 can have a non-elliptical shape.

Each flow passage 54 turns through an angle of approximately 180° between a plane defined by the inlet ports 53 and a plane defined by the outlet port 59. Each flow passage 54 also has a gradually increasing flow area such that the outlet port 59 has a flow area larger than the sum of the flow areas of the two inlet ports 53. Accordingly, the flow passing through the flow passages 54 can gradually decelerate as it approaches the outlet port 59. As a result, particulates can drop into the filter element 80 rather than being projected at high velocity into the filter element 80. An advantage of this arrangement is that the particulates may be less likely to pierce or otherwise damage the filter element 80.

As shown in FIG. 6, the outlet port 59 can be surrounded by a lip 58 that extends downwardly toward the filter element 80. In one aspect of this embodiment, the lip 58 can extend into the filter element to seal the interface between the manifold 50 and the filter element 80. As will be discussed in greater detail below, the filter element 80 can include a flexible portion that sealably engages the lip 58 to reduce the likelihood of leaks at the interface between the manifold 50 and the filter element 80.

In one embodiment, the filter element 80 includes a generally tubular-shaped wall 81 having a rounded rectangular or partially ellipsoidal cross-sectional shape. The wall 81 can include a porous filter material, such as craft paper lined with a fine fiber fabric, or other suitable materials, so long as the porosity of the material is sufficient to allow air to pass therethrough while preventing particulates above a selected size from passing out of the filter element 80. The wall 81 is elongated along an upwardly extending axis 85 and can have opposing portions that curve outwardly away from each other. In one embodiment, the wall 81 is attached to a flange 82 that can induce a rigid or partially rigid material, such as cardboard and that extends outwardly from the wall 81. The flange 82 has an opening 83 aligned with the outlet port 59 of the manifold 50. In one embodiment, the opening 83 is lined with an elastomeric rim 84 that sealably engages the lip 58 projecting downwardly from the outlet port 59 of the manifold 50. In one aspect of this embodiment the flange 82 formed from two layers of cardboard with an elastomeric layer in between, such that the elastomeric layer extends inwardly from the edges of the cardboard in the region of the outlet port 59 to form the elastomeric ring 84.

In one embodiment, the lower end of the filter element 80 is sealed by pinching opposing sides of the wall 81 together. In another embodiment, the end of the filter element 80 is sealed by closing the opposing sides of the wall 81 over a mandrel (not shown) such that the cross-sectional shape of the filter element is generally constant from the flange 82 to a bottom 86 of the filter element 80. An advantage of this arrangement is that the flow passing through the filter element 80 will be less likely to accelerate, which may in turn reduce the likelihood that the particles within the flow or at the bottom of the filter element 80 will be accelerated to such a velocity as to pierce the wall 81 or otherwise damage the filter element 80. In this manner, lighter-weight particles may be drawn against the inner surface of the wall 81, and heavier particles can fall to the bottom 86 of the filter element 80.

As shown in FIG. 6, the filter element 80 is removably lowered into the filter housing 70 from above. In one embodiment, the filter housing 70 can include a tube having a wall 75 elongated along the axis 85. The wall 75 can be formed from a porous material, such as a woven polyester fabric, connected to an upper support 71 and a lower support 72. The upper support 71 can have a generally flat upwardly facing surface that receives the flange 82 of the filter element 80. The forward facing surface of the wall 75 can include text and/or figures, for example, a company name, logo, or advertisement. The forward and rear portions of the wall 75 can curve outwardly away from each other to blend with intermediate opposing side walls adjacent the conduits 30, and to correspond generally to the shape of the filter element 80.

Each of the supports 71, 72 includes an upper portion 73a and a lower portion 73b fastened together with screws 74. As is best seen in cross-section in FIG. 7, each upper portion 73a has a flange 78a that extends alongside a corresponding flange 78b of the lower portion 73b, clamping an edge of the wall 75 of the filter housing 70 therebetween. In other embodiments, the supports 71, 72 can include other arrangements for supporting the housing 70. The lower portion 73b of the lower support 72 has a closed lower surface 67 that forms the base of the filter housing 70. The upper portion 73a of the lower support 72 and both the upper and lower portions of the upper support 71 have open upper surfaces that allow the filter housing 70 to extend upwardly therethrough, and allow the filter element 80 to drop downwardly into the filter housing.

Returning to FIG. 6, the upper and lower supports 71, 72 each have conduit apertures 77 sized to receive the straight sections 36. In one embodiment, the conduit apertures 77 are surrounded by flexible projections 69 attached to the lower portions 73b of each support 71, 72. The projections 69 clamp against the straight sections 36 to restrict motion of the straight sections 36 relative to the supports 71, 72. In a further aspect of this embodiment, the projections 69 of the upper support 71 have circumferential protrusions 68 that engage a corresponding groove 41 of the straight section 36 to prevent the straight section 36 from sliding axially relative to the upper support 71.

The upper and lower supports 71, 72 also include handle apertures 76 that receive a shaft 47 of the handle 45. The lowermost aperture 76a has a ridge 79 that engages a slot 44 of the handle shaft 47 to prevent the shaft from rotating. The handle 45 includes a grip portion 48 which extends upwardly beyond the filter housing 70 where it can be grasped by the user for moving the vacuum cleaner 10 (FIG. 1) and/or for rotating the filter housing 70 and the conduits 30 relative to the airflow propulsion device 200, as was discussed above with reference to FIG. 2. The grip portion 48 can also include a switch 46 for activating the vacuum cleaner 10. The switch 46 can be coupled with an electrical cord 49 to a suitable power outlet, and is also coupled to the fan motor 250 (FIG. 3) and the brush motor 42 (FIG. 2) with electrical leads (not shown).

The upper support 71 includes two gaskets 57 for sealing with the manifold 50. In one embodiment, the manifold 50 is removably secured to the upper support 71 with a pair of clips 60. Accordingly, the manifold 50 can be easily removed to access the filter element 80 and the spare belt or belts 141a. In another embodiment, the manifold 50 can be secured to the upper support 71 with any suitable releasable latching mechanism, such as flexible, extendible hands 60a show in hidden lines in FIG. 6.

Figure 8:
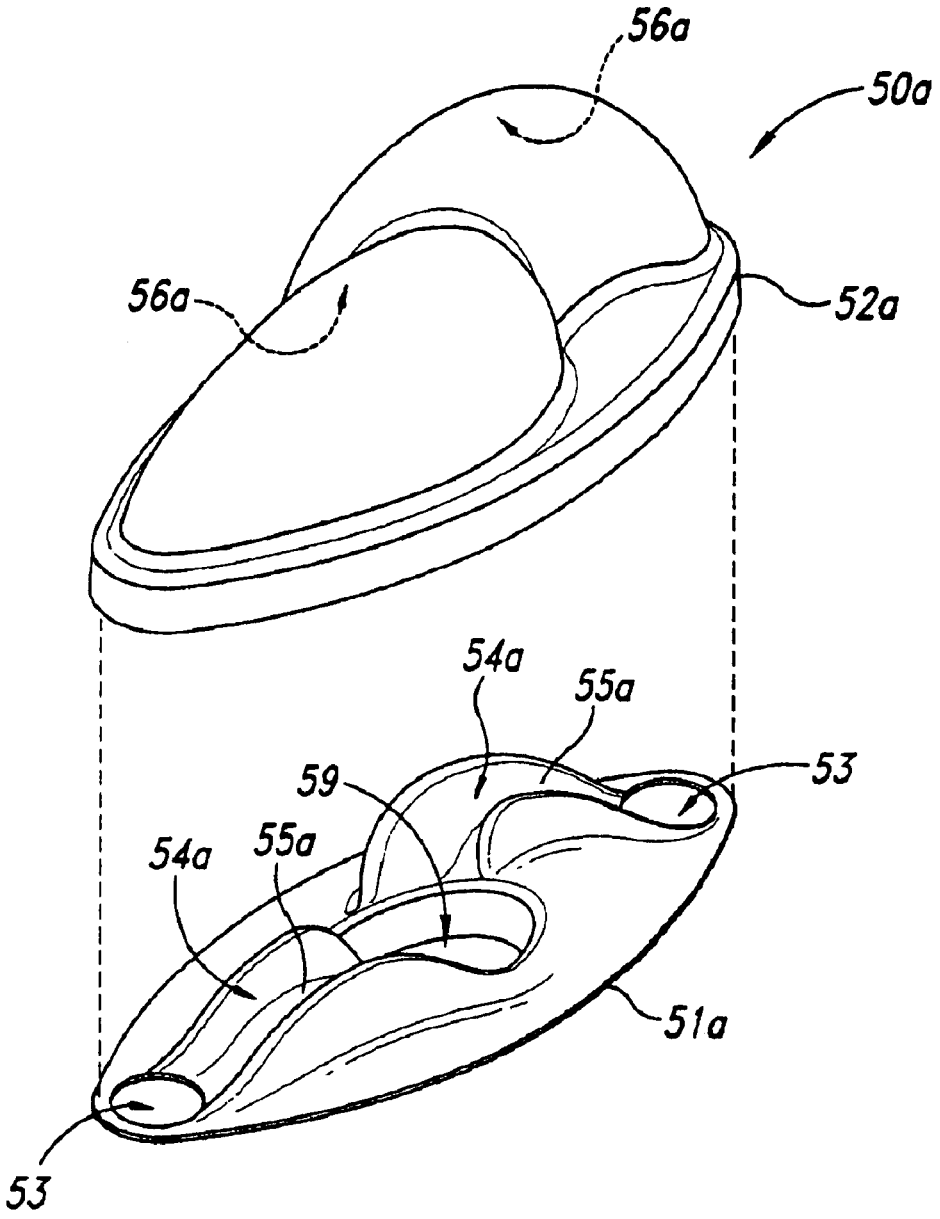
FIG. 8 is an exposed top isomeric view of a manifold in accordance with another embodiment of the invention.

FIG. 8 is an exploded isometric view of a manifold 50a in accordance with another embodiment of the invention. The manifold 50a includes a lower portion 51a connected to an upper portion 52a. The lower portion 51a has an outlet port 59 with an elliptical shape elongated along a major axis. Flow passages 54a couple to the outlet port 59 toward opposite ends of a minor axis that extends generally perpendicular to the major axis. The flow passages 54a are bounded by an upward facing surface 55a of the lower portion 51a and by a downward facing surface 56a of the upper portion 52a, in a manner generally similar to that discussed above with reference to FIG. 6.

From the foregoing it will be appreciated that, although specific embodiment of the invention have been described herein for purposes of illustration, various modifications may be made without deviating from the spirit and scope of the invention. Accordingly, the invention is not limited except as by the appended claims.

What is claimed is:

1. A vacuum cleaner, comprising:

an intake body having an intake opening configured to be positioned proximate to a floor surface for receiving a flow of air and particulates;

a filter element for separating the particulates from the flow of air;

at least one conduit coupled between the intake body and the filter element; and an airflow propulsion device coupled between the intake opening and the at least one conduit to draw the flow of air and particulates through the intake opening and toward the filter element, wherein the intake opening, the propulsion device and the conduit define a flow path for the flow of air and particulates and the flow path has an approximation constant flow area from the intake opening to the propulsion device.

2. The vacuum cleaner of claim 1 wherein the airflow propulsion device includes a rotatable fan coupled to an electric motor, the fan having a hub and a plurality of vanes extending radially outwardly from the hub, the hub and vanes being rotatable relative to the intake body to move the flow of air and particulates along the flow path.

3. The vacuum cleaner of claim 1 wherein the intake opening has an intake flow area and the conduit is a first conduit, further comprising a second conduit spaced apart from the first conduit, a combined flow area of the two conduits being less than the intake flow area.

4. The vacuum cleaner of claim 1, further comprising a manifold having a first opening coupled to the at least one conduit and a second opening configured to be in fluid communication with the filter element, the manifold having a first flow area proximate to the first opening and a second flow area proximate to the second opening, the second opening being larger than the first opening to reduce a velocity of the airflow passing through the manifold.

5. The vacuum cleaner of claim 1 wherein the intake opening has a width of approximately 16 inches.

6. The vacuum cleaner of claim 1 wherein the intake opening has a width of approximately 20 inches.

7. The vacuum cleaner of claim 1 wherein walls of the flow path are generally smooth.

8. The vacuum cleaner of claim 1 wherein a minimum curvature of the flow path is equal to or greater than approximately 0.29 inches.

9. The vacuum cleaner of claim 1 wherein the at least one conduit has a generally upright portion with an approximately constant flow area that is less than the flow area of the intake opening.

10. The vacuum cleaner of claim 1 wherein the propulsion device has an entrance opening with a generally circular cross-sectional shape and the intake opening has a generally rectangular cross-sectional shape.

11. A vacuum cleaner, comprising:

an intake body having an intake opening configured to be positioned proximate to a floor surface for receiving a flow of air and particulates from the floor surface;

a filter element for separating the particulates from the flow of air;

at least one conduit coupled between the intake body and the filter element; and an airflow propulsion device coupled between the intake opening and the at least one conduit, wherein the intake opening, the propulsion device and the conduit define a flow path, the flow path having an approximately constant flow area from the intake opening to the propulsion device, the flow path from the intake opening through the propulsion device having a radius of curvature not less than approximately 0.29 inches to provide smooth flow along the flow path.

12. The vacuum cleaner of claim 11 wherein the airflow propulsion device has an entrance opening for receiving the flow of air and particulates and an exit opening for exiting the flow of air and particulates, further wherein the flowpath changes direction by approximately 90° between the entrance opening and the exit opening.

13. The vacuum cleaner of claim 11 wherein the airflow propulsion device includes a rotatable fan couple to an electric motor, the fan having a hub and a plurality of vanes depending from the hub, the hub and vanes being rotatable relative to the intake body to move the flow of air and particulates along the flow path.

14. The vacuum cleaner of claim 11, further comprising a manifold having a first opening coupled to the at least one conduit and a second opening configured to be in fluid communication with the filter element, the manifold having a first flow area proximate to the first opening and a second flow area proximate to the second opening, the second flow area being larger than the first opening to reduce a velocity of the airflow passing through the manifold.

15. The vacuum cleaner of claim 11 wherein walls of the flow path are generally smooth.

16. The vacuum cleaner of claim 11 wherein the at least one conduit includes a generally horizontal portion, a generally vertical portion and a transition portion between the horizontal and vertical portions, the flow path through the transition portion having a minimum radius of curvature of approximately 0.29 inches.

17. A vacuum cleaner, comprising:

an intake body having an intake opening for receiving a flow of air and particulates, the intake body further having *an intake flow area and* at least two exit openings;

a filter element to separate the particulates from the flow of air;

at least two conduits, each having a first aperture coupled to one of the exit openings of the intake body and a second aperture in fluid communication with the filter element, *and with each conduit of the at least two conduits having a conduit flow area wherein the sum of the conduit flow areas is less than the intake flow area in order to accelerate the flow through the conduits*; and an airflow propulsion device coupled between the intake opening and the exit openings for moving the flow of air from the intake opening to the filter element.

[18. The vacuum cleaner of claim 17 wherein the intake opening has an intake flow area and the conduits each have a conduit flow area, the sum of the conduit flow areas being less than the intake flow area to accelerate the flow through the conduits.]

19. The vacuum cleaner of claim 17 wherein the conduits have generally smooth internal surfaces.

20. The vacuum cleaner of claim 17 wherein the conduits extend in generally straight parallel lines on opposite sides of the filter element.

21. The vacuum cleaner of claim 17 wherein a portion of each conduit extends outwardly from opposite sides of the intake body.

22. A vacuum cleaner, comprising:

an intake body having an intake opening configured to be positioned proximate to a surface for receiving a flow of air and particulates, the intake body further having at least two exit openings for simultaneously directing the flow of air and particulates out of the intake body;

a filter element for separating at least some of the particulates from the flow of air and particulates;

at least two conduits in fluid communications with the intake body [and the filter element]; [and]

*a manifold in fluid communication with the filter element and in fluid communication with the at least two conduits, with the manifold including a first portion coupled to a first conduit and a second portion coupled to a second conduit and wherein at least two air flows in the at least two conduits are merged in the manifold and provided to the filter element;* an airflow propulsion device for moving the flow of air and particulates from the intake opening to the filter element.

23. The vacuum cleaner of claim 22 wherein the airflow propulsion device is coupled between the intake opening and the conduits.

24. The vacuum cleaner of claim 22, further comprising a brush proximate to the intake opening, the brush having an arrangement of bristles that is symmetric about a symmetry plane.

25. The vacuum cleaner of claim 24 wherein the brush is rotatably mounted proximate to the intake opening and is rotatable relative to the intake opening.

[26. The vacuum cleaner of claim 22, further comprising a manifold between the conduits and the filter element, the manifold including a first portion coupled to a first conduit and a second portion coupled to a second conduit.]

27. The vacuum cleaner of claim 22 wherein a first conduit extends independently of a second conduit from the intake body to the [filter element] *manifold*.

[28. The vacuum cleaner of claim 22 wherein the conduits do not merge until they approach the filter element.]

29. The vacuum cleaner of claim 22 wherein [one] *a* conduit *of the at least two conduits* is in fluid communication with each of the at last two exit openings *of the intake body*.

[30. A vacuum cleaner, comprising:

an intake body having an intake opening configured to be positioned proximate to a floor surface for receiving a flow of air and particulates, the intake body having a lower surface proximate to the floor surface and a vent for exhausting cooling flow for cooling a component within the intake body;

a filter element of separating the particulates from the flow of air;

a flow channel coupled between the intake body and the filter element; and at least one wheel coupled to the intake body and projecting below at least a portion of the lower surface of the intake body to elevate the portion of the intake body above the floor surface, the wheel being positioned in a path of the cooling air passing outwardly through the vent to diffuse the cooling air.]

[31. The vacuum cleaner of claim 30 wherein the intake body has a forward edge and a rear edge opposite the forward edge, further wherein the wheel is a rear wheel positioned proximate the rear edge of the intake body.]

[32. The vacuum cleaner of claim 30 wherein the vent is an exhaust vent and the intake body has an intake vent spaced apart from the exhaust vent for receiving the cooling air.]

* * * * *